United States Patent [19]

Funahashi

[11] Patent Number: 4,809,085
[45] Date of Patent: Feb. 28, 1989

[54] RECORDING AND REPRODUCING APPARATUS FOR REDUCING CROSS-TALK IN COLOR TELEVISION SIGNAL

[75] Inventor: Toshihiro Funahashi, Saijo, Japan

[73] Assignee: Matsushita Electric Industrial Co., Ltd., Kadoma, Japan

[21] Appl. No.: 916,654

[22] Filed: Oct. 8, 1986

[30] Foreign Application Priority Data

Oct. 9, 1985 [JP] Japan .................................. 60-225149
Oct. 29, 1985 [JP] Japan .................................. 60-241939

[51] Int. Cl.$^4$ ............................................. H04N 9/80
[52] U.S. Cl. .................................................. 358/329
[58] Field of Search ...................... 358/31, 36, 37, 310, 358/328, 329

[56] References Cited

U.S. PATENT DOCUMENTS

| 4,186,411 | 1/1980 | Numakura | 358/328 |
| 4,242,699 | 12/1980 | Kobayashi et al. | 358/329 |
| 4,513,311 | 4/1985 | Hirai et al. | 358/329 |
| 4,612,585 | 9/1986 | Takasi et al. | 358/328 |
| 4,626,927 | 12/1986 | Hirota et al. | 358/310 |
| 4,647,960 | 3/1987 | Miura et al. | 358/329 |
| 4,737,862 | 4/1988 | Koga | 358/329 |

Primary Examiner—Donald McElheny, Jr.
Attorney, Agent, or Firm—Cushman, Darby & Cushman

[57] ABSTRACT

A recording and reproducing apparatus comprising a comb filter which is used both at recording and at reproducing and which is a recursive type filter using a phase advance circuit. The phase of the chrominance signal is advanced in phase by a time corresponding to the delay time produced in a feedback part of a recursive type comb filter so as to eliminate delay errors at the 1H delay during chrominance/luminance separation.

4 Claims, 9 Drawing Sheets

RECORDING AND REPRODUCING APPARATUS FOR REDUCING CROSS-TALK IN COLOR TELEVISION SIGNAL

FIELD OF THE INVENTION AND RELATED ART STATEMENT

1. Field of the Invention

The present invention is related to a recording and reproducing apparatus for sequentially recording and reproducing an NTSC type color television signal on a recording medium and particularly to a processing circuit system for a chrominance signal.

2. Description of the Related Art

Figure 1:
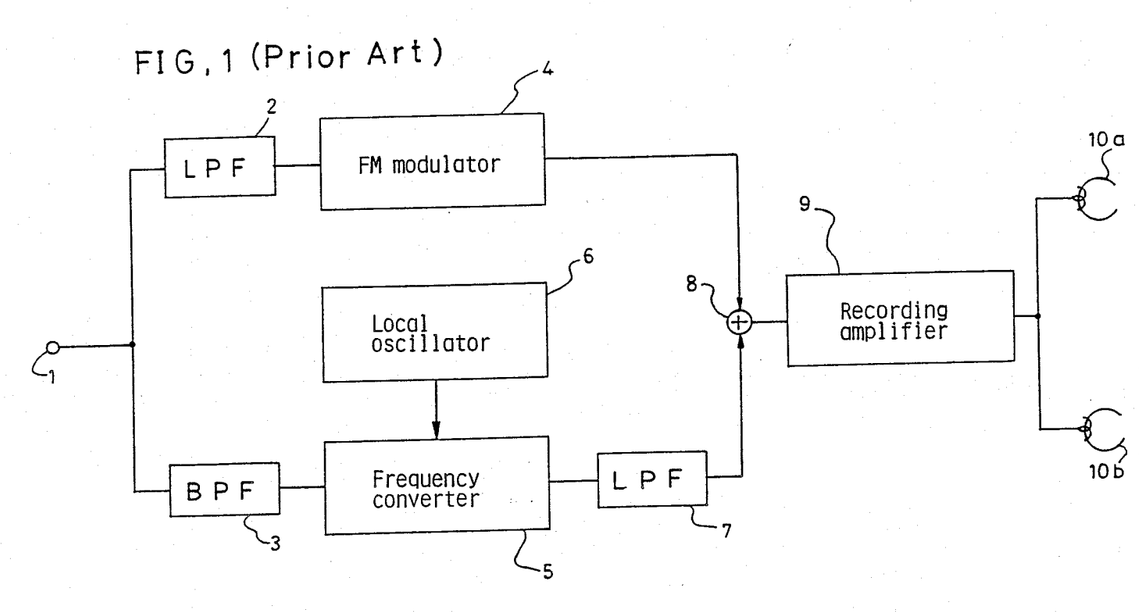
FIG. 1 is the block diagram of the video signal recording system of a conventional VTR.
Figure 2:
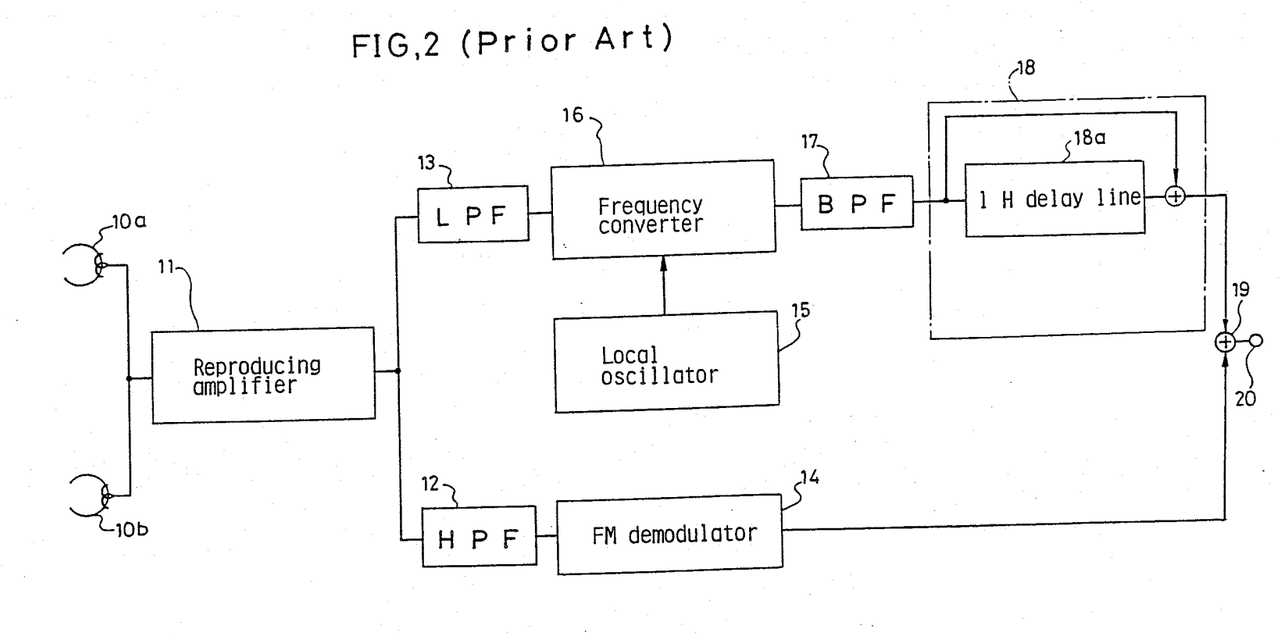
FIG. 2 is the block diagram of the video signal reproducing system of the conventional VTR.

The recording and reproducing circuit system for a video signal in the conventional helical scanning type of magnetic recording and reproducing apparatus (VTR) has such constitution as shown in FIG. 1 and FIG. 2.

FIG. 1 is a block diagram showing the recording system. A color television signal to be recorded is applied to an input terminal 1 and is separated into a luminance signal and a chrominance signal based on a frequency, by using a low pass filter (LPF) 2 and a band pass filter (BPF) 3. The separated luminance signal is frequency-modulated into an FM luminance signal of a low carrier wave by an FM modulator 4. The separated chrominance signal, for example, of 3.58 MHz, is frequency-converted into a chrominance signal in a low frequency band by a frequency converter 6 which receives output signals of a local oscillator 6, the output signals of which are in synchronism with the chrominance signal. The frequency-converted chrominance signal is passed through an LPF 7. Then, the obtained low-band-converted chrominance signal, for example of 629 KHz, is added to the FM luminance signal of a low carrier wave by a mixer 8, the band of which is higher than the band of the chrominance signal. The mixed signal from a recording amplifier 9 then is recorded on a recording medium by using magnetic heads 10a and 10b. The azimuth angles of the magnetic heads 10a and 10b are different from each other. Guard-band-less recording is alternately executed by using the magnetic heads 10a and 10b for every recording track.

Thus, when the magnetic heads 10a and 10b of different azimuth angles are used on neighboring tracks, cross-talk of the FM luminance signal of a low frequency carrier wave from the neighboring track may be avoided at reproducing by using the azimuth loss.

The cross-talk of the low-band-converted chrominance signal from the neighboring track, however, cannot be suppressed enough since the low-band-converted chrominance signal does not obtain enough azimuth loss effect. Accordingly, the low-band-converted chrominance signals on the neighboring tracks are selected so as to have an interleave relation to each other by varying the phases of the output of the local oscillator 6 at certain intervals at recording. Under such conditions, the cross-talk of the low-band-converted chrominance signal from the neighboring track can be avoided, as mentioned below, by using a comb filter, which comprises a 1H delay line which gives a delay time of 1 horizontal scanning period on the basis of a vertical line correlation.

FIG. 2 is a block diagram showing the reproducing system. The signal reproduced by the magnetic heads 10a and 10b through a reproducing amplifier 11 is separated into the FM luminance signal of a low carrier wave and the low-band-converted chrominance signal by using a high pass filter HPF 12 and a low pass filter LPF 13, respectively.

The FM luminance signal of a low carrier wave is demodulated into the luminance signal having the original frequency band by an FM demodulator 14. On the other hand, the low-band-converted chrominance signal is frequency-converted by a frequency converter 16 which receives the outputs of a local oscillator 15. The original chrominance signal of 3.58 MHz is obtained through a band pass filter BPF 17. Further, as mentioned above, in order to avoid the cross-talk from the neighboring track, the chrominance signal is passed through a comb filter 18 comprising a 1H delay line 18a shown in more detail in FIG. 3. The passed chrominance signal is mixed with the demodulated luminance signal by a mixing circuit 19, and thereby the original color video signal is obtained from the output terminal 20.

However, under the above conventional system, at recording the chrominance signal is separated only based on frequency of the color television signal by the BPF 3. Therefore, the frequency-separated chrominance signal band includes the high band component of the luminance signal which is frequency-interleaved with the chrominance signal. Therefore, when the high band component of the luminance signal exists in the cross-talk component from the neighboring track, the cross-talk of the high band component of the luminance signal from the neighboring track can not be completely eliminated at reproducing, even if the chrominance signal is passed through the comb filter comprising 1H delay line on the basis of the line correlation. Thus, the conventional magnetic recording and reproducing apparatus has problems of picture defect due to cross color disturbance, or the like.

Figure 3:
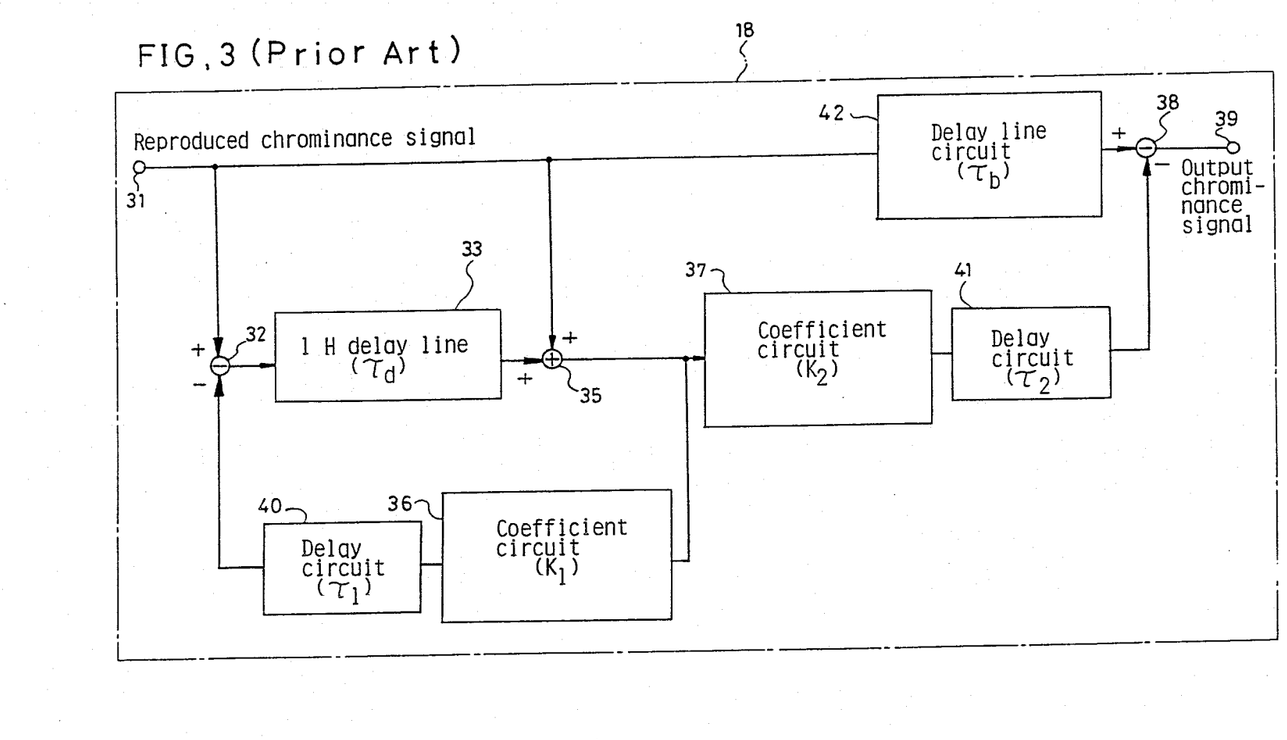
FIG. 3 is the block diagram of the conventional comb filter.

Further, the conventional comb filter itself has the following disadvantage. Hitherto, a recursive type comb filter has been proposed, the filter comprising a recursive type of signal processing circuit in order to improve the characteristics of the comb filter using a 1H delay circuit for avoiding the cross-talk of the chrominance signal from the neighboring track. FIG. 3 is an example of such a recursive type comb filter of the color signal processing circuit of the conventional magnetic recording and reproducing apparatus.

In FIG. 3, the reproduced chrominance signal is applied to an input end terminal 31. The input end terminal 31 is connected to a subtracter 32 and an adder 35. A 1H delay circuit 33 is connected between the subtracter 32 and the adder 35. The adder 35 is connected to a subtracter 38 through a coefficient circuit 37 and a delay circuit 41. The input end terminal 31 is also connected to the subtracter 38 through a delay circuit 42. The subtracter 38 is connected to an output end terminal 39. The adder 35 is connected to the subtracter 32 through a coefficient circuit 36 and a delay circuit 40. The delay time ($\tau_1$) to be caused by the coefficient circuit 36 is represented by the delay circuit 40 of the independent block. The delay time ($\tau_2$) to be caused by the coefficient circuit 37 is represented by the delay circuit 41 of the independent block. The delay circuit 42 is a circuit for compensating the delay time of the delay circuit 41. The sum signal from the adder 35 is fed back to the subtracter 32 through the coefficient circuit 36 and the delay circuit 40.

The operation of the recursive type comb filter of the color signal processing circuit of the above-mentioned conventional magnetic recording and reproducing apparatus is described as follows.

The reproduced chrominance signal applied to the input end terminal 31 and an output delay signal of the 1H delay circuit 33 are added by the adder 35. The sum signal is fed back from the adder 35 to the subtracter 32. The subtracter 32 subtracts the sum signal from the chrominance signal. The difference signal is applied to the 1H delay circuit 33 from the subtracter 32. The sum signal from the adder 35 is applied to the subtracter 38 through the coefficient circuit 37 and the delay circuit 41, and the chrominance signal is applied to the subtracter 38 through the delay circuit 42, thereby enabling the subtracter 38 to subtract the output of the delay circuit 41 from the output of the delay circuit 42. Thus, the processed chrominance signal is obtained by the output end terminal 39.

Thus, a superior comb filter capability is theoretically obtained. A chrominance signal having a good S/N is theoretically obtained, that is, a steep comb characteristic is obtained, and nise such as the cross-talk from the neighboring track is avoided. However, when the S/N of the reproduced chrominance signal is intended to be fairly improved by avoiding the noise component such as the cross-talk component from the neighboring track, the feedback coefficient $K_1$ of the coefficient circuit 36 should be made sufficiently large. Then, in order to make the coefficient $K_1$ large, the gain of the ampolifier provided for the practical coefficient circuit etc. should be increased. Then, there is such disadvantage that the delay time (phase delay) produced by the increased gain, namely, the delay time $\tau_1$ of the delay circuit 40 is increased.

On the other hand, when the line correlation is weak, for example, when the hue variation in a vertical direction is large or there is no color at a part of the screen, there are such disadvantages in the recursive type comb filter that such phenomenon (hereinafter called color-mis-registration) occurs in which color oozes out from the color boundary downward. In order to reduce such a problem, it has been proposed that an amplitude limiter be added to the above circuit system or that the coefficient of the coefficient circuit 36 is changed to respond to the line correlation strength detected by a certain procedure.

Then, when the amplitude limiter is added for reducing the above-mentioned color-mis-registration, a further increase of the delay time $\tau_1$ occurs because of the increase of the amplifier gain. That is, enough improving effect of S/N and enough reducing effect of the color-mis-registration causes an increase of the delay time of the feedback part. Even though the delay time is minute, a very large time delay is produced because feedback is used. Accordingly, a preferable effect cannot be obtained.

The design conditions for preferable and normal operation of the recursive type comb filter is as follows.

In order that the phase of the input chrominance signal and the phase of the feedback signal through the coefficient circuit 36 are coincident at the subtracter 32, the following equation should hold:

$$\tau_d + \tau_1 = 1H \tag{1}$$

Here, $\tau_d$ is the delay time of the 1H delay circuit 33.

In order that the phase of the input chrominance signal to the adder 36 and the phase of the output signal of the 1H delay circuit 33 are coincident with each other, the following equation should hold:

$$\tau_d = 1H \tag{2}$$

In order that the phase of the output signal of the delay circuit 42 and the phase of the output signal of the coefficient circuit 37 are coincident at the subtracter 38, the below equation also should hold:

$$\tau_d + \tau_2 = 1H + \tau_b \tag{3}$$

wherein, the delay times of the delay circuits 41 and 42 are $\tau_2$ and $\tau_b$, respectively.

The following equation is derived from the above equations (2) and (3).

$$\tau_2 = \tau_b \tag{4}$$

That is, it is apparent that the delay time $\tau_b$ should be designed to be equal to the delay time $\tau_2$. Further, $\tau_1 = 0$ is derived from the equations (1) and (2). However, actually $\tau_1 > 0$ is positive, and the filter is compelled to be driven in a direction of increasing the $\tau_1$. Therefore, a contradiction is produced.

Therefore, for the present, the conventional recursive type comb filter cannot sufficiently exhibit its inherent designed capability. That is, it is difficult to freely set the feedback coefficient of the coefficient circuit and the amplitude limiting level of the amplitude limiter. Accordingly, it is considerably difficult to obtain a sufficient S/N-improving effect and the effect of reducing color-mis-registration during practical use.

OBJECT AND SUMMARY OF THE INVENTION

In view of the above-mentioned problems of the prior art, the present invention intends to offer a magnetic recording and reproducing apparatus in which the picture deterioration caused by cross color can be minimized or eliminated by reducing or avoiding the high band and frequency-interleaved luminance signal component from the chrominance signal frequency-separated from the color video signal.

A recording and reproducing apparatus for a color television signal of the present invention comprises:

a low pass filter for separating the luminance signal from a color television signal to be recorded, a comb filter for separating a chrominance signal from the color television signal, an FM modulator for frequency-modulating the luminance signal to obtain an FM luminance signal of a low carrier wave, a first converter for converting the chrominance signal into a low frequency band, thereby to obtain a low-band-converted chrominance signal in a manner such that recorded chrominance signals on neighboring recording tracks have an interleave relation to each other, a first mixer for mixing the FM luminance signal of a low carrier wave with the low band converted chrominance signal, magnetic heads for recording an output signal of the mixer on a magnetic recording medium, the magnetic heads of neighboring tracks having different azimuth angles with respect to each other, a high pass filter for separating an FM luminance signal of a low carrier wave from a reproduced signal, a low pass filter for separating a low band converted chrominance signal from the reproduced signal, a frequency demodulator for demodulating the reproduced FM luminance signal of a low carrier wave to obtain a reproduced luminance signal, a second converter for converting the reproduced low-band-converted chrominance signal into a reproduced converted chrominance signal, and a second mixer for mixing the demodulated luminance signal with the reproduced converted chrominance signal which passed through the comb filter, thereby to obtain a reproduced color television signal.

BRIEF DESCRIPTION OF THE DRAWINGS

FIG. 6 is a circuit diagram of an embodiment of a phase advance circuit in the circuit of FIG. 5.

DESCRIPTION OF THE PREFERRED EMBODIMENTS

An embodiment of a magnetic video recording and reproducing apparatus of the present invention is described as follows referring to the drawings of FIG. 4 and thereafter.

Figure 4:
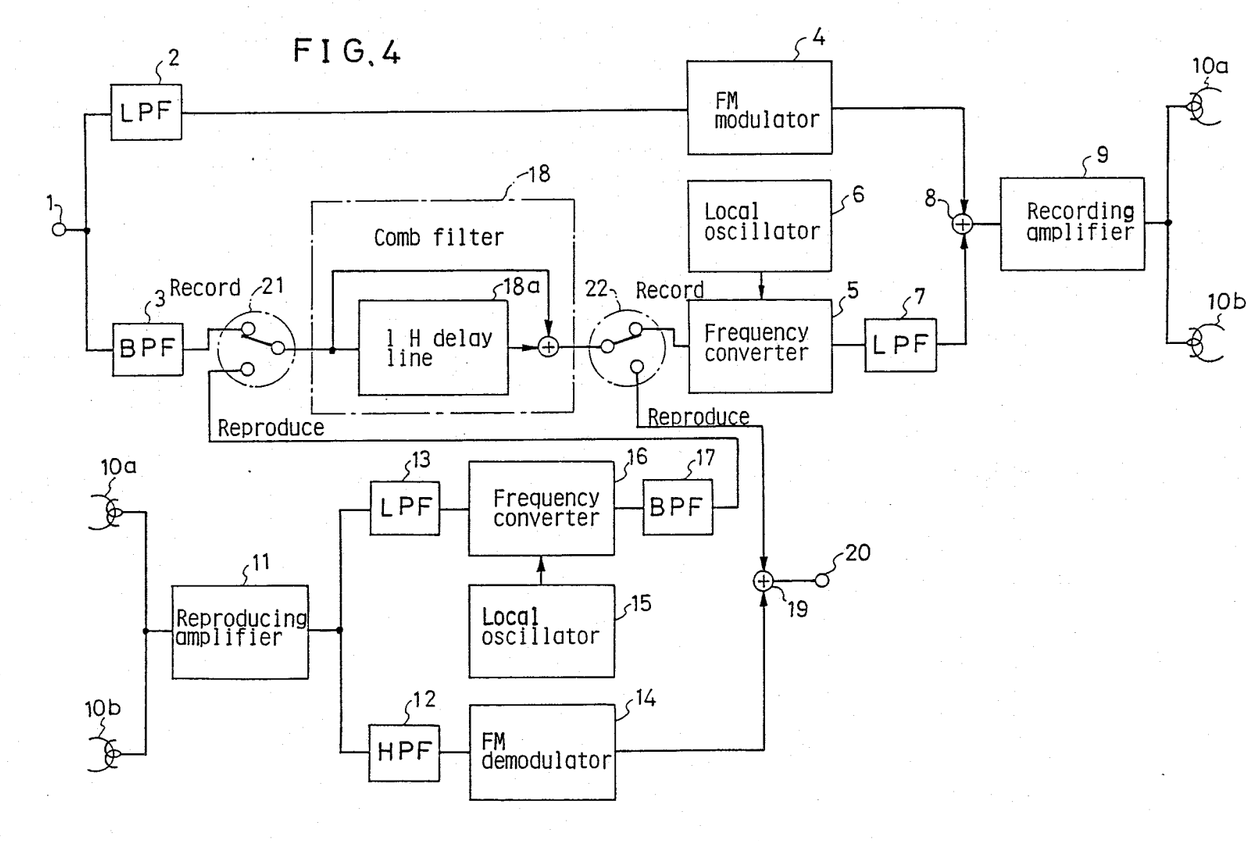
FIG. 4 is a block diagram showing an embodiment of the video signal recording and reproducing system of the VTR of the present invention.

FIG. 4 is a block diagram showing the video signal recording and reproducing system of the magnetic video recording and reproducing apparatus of the first embodiment of the present invention. The video signal recording and reproducing system comprises an input end terminal 1, a LPF (low pass filter) 2 whose input terminal is connected to the input terminal 1, a BPF (band pass filter) 3 whose input terminal is connected also to the input terminal 1, an FM modulator 4 whose input terminal is connected to the output end of the LPF 2, a frequency converter 5, a local oscillator 6 whose output terminal is connected to the frequency converter 5, a LPF 7 whose input terminal is connected to the frequency converter 5, a mixer 8 whose input terminal is connected to the FM modulator 4 and the LPF 7, a recording amplifier 9 whose input terminal is connected to the mixer 8 and magnetic heads 10a and 10b whose input terminals are connected to the amplifier 9 like those of FIG. 1.

Further, the present invention comprises a reproducing amplifier 11 whose output terminal is connected to the magnetic heads 10a, 10b, a HPF 12 whose input terminal is connected to the amplifier 11, a LPF 13 whose input terminal is connected to the amplifier 11, an FM demodulator 14 whose input terminal is connected to the HPF 12, a local oscillator 15, a frequency converter 16 whose input terminal is connected to the LPF 13, a BPF 17 whose input terminal is connected to the converter 16, a comb filter 18 having a 1H delay line 18a, a mixer 19 whose input terminal is connected to the FM modulator 14 and an output end terminal 20 like those of FIG. 1. Furthermore, it comprises a switching circuit 21 and a switching circuit 22. At recording, the comb filter 18 is inserted before the frequency converter 5 by switching operation of the switching circuits 21, 22. Then the luminance signal component which is frequency-interleaved in the chrominance signal band is avoided by the comb filter 18. The chrominance signal including no luminance signal component is frequency-converted to a low band converted chrominance signal by the frequency converter 5 in a similar manner as in the prior art arrangement of FIG. 1. At reproducing, the comb filter is switched to be inserted between BPF 17 which is in the stage after the frequency converter 16 and a summing point 19, by the switching operation of the switching circuits 21 and 22. Then the same reproducing system as that of FIG. 2 is realized.

As mentioned above, the luminance signal component which is frequency-interleaved in the chrominance signal band is eliminated, and therefore there is no more problem of causing picture deterioration such as cross color disturbance by cross-talks including the high band luminance signal component which passes through the comb filter at reproducing.

Incidentally, the BPFs 3 and 17 are provided before the comb filter 18 in the above embodiment, but the BPFs 3 and 17 can be provided after the comb filter 18.

Figure 5:
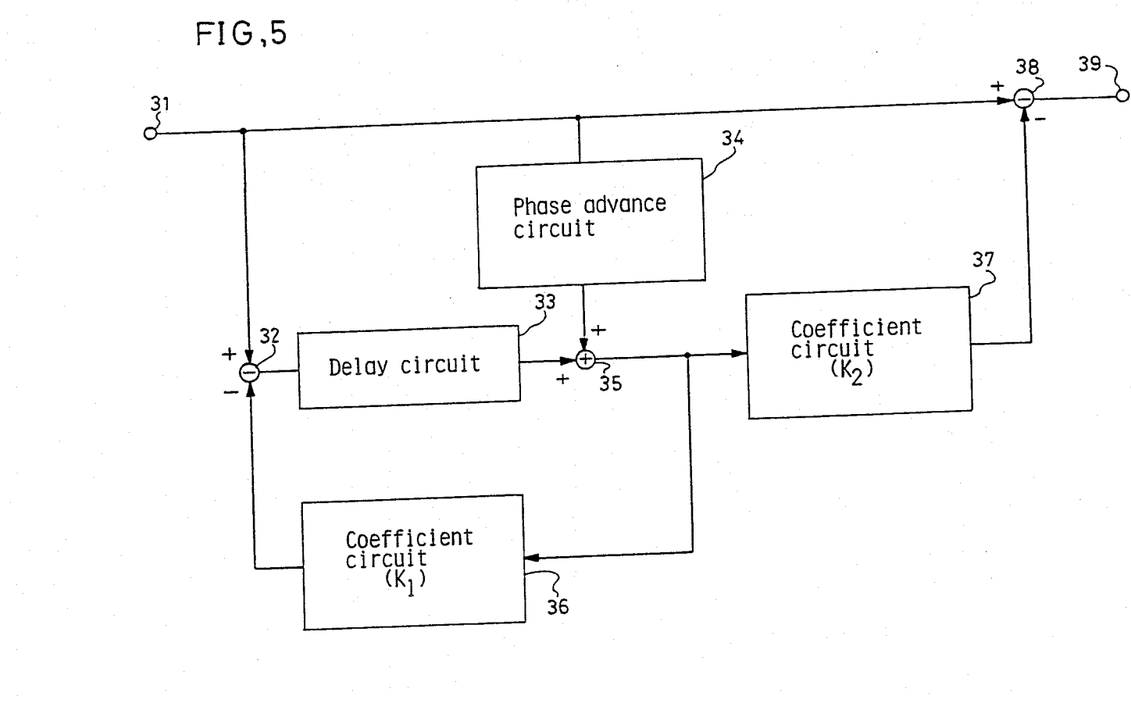
FIG. 5 is a block diagram of an embodiment of a recursive type comb filter of the present invention.

FIG. 5 is a block diagram showing a first embodiment of a recursive type comb filter of a color signal processing circuit of the magnetic video recording and reproducing apparatus of the present invention. In FIG. 5, an input terminal 31 receives the reproduced chrominance signal. The input terminal 31 is connected to the input end of a substracter 32 and to the input end of a phase advance circuit 34. The output end of the phase advance circuit 34 is connected to the input end of an adder 35. The output end of the subtracter 32 is connected to an input end of the adder 35 through a delay circuit 33. The output end of the adder 35 is connected to the input end of the subtracter 32 through a coefficient circuit 36. The output end of the adder 35 is also connected to an input end of a subtracter 38 through a coefficient circuit 37. The input terminal 31 also is connected to the input end of the subtracter 38. The coefficient circuit 36 gives a feedback coefficient $K_1$ and has a delay time $\tau_1$. The coefficient circuit 37 gives a coefficient $K_2$ and has a delay time $\tau_2$. The delay time of the delay circuit 33 is shortened by the delay time $\tau_1$ of the coefficient circuit 36 against 1H. The subtracter 38 is connected to an output terminal 39. The phase advance circuit 34 advances the phase by an amount corresponding to the delay time $\tau_1$.

Figure 7:
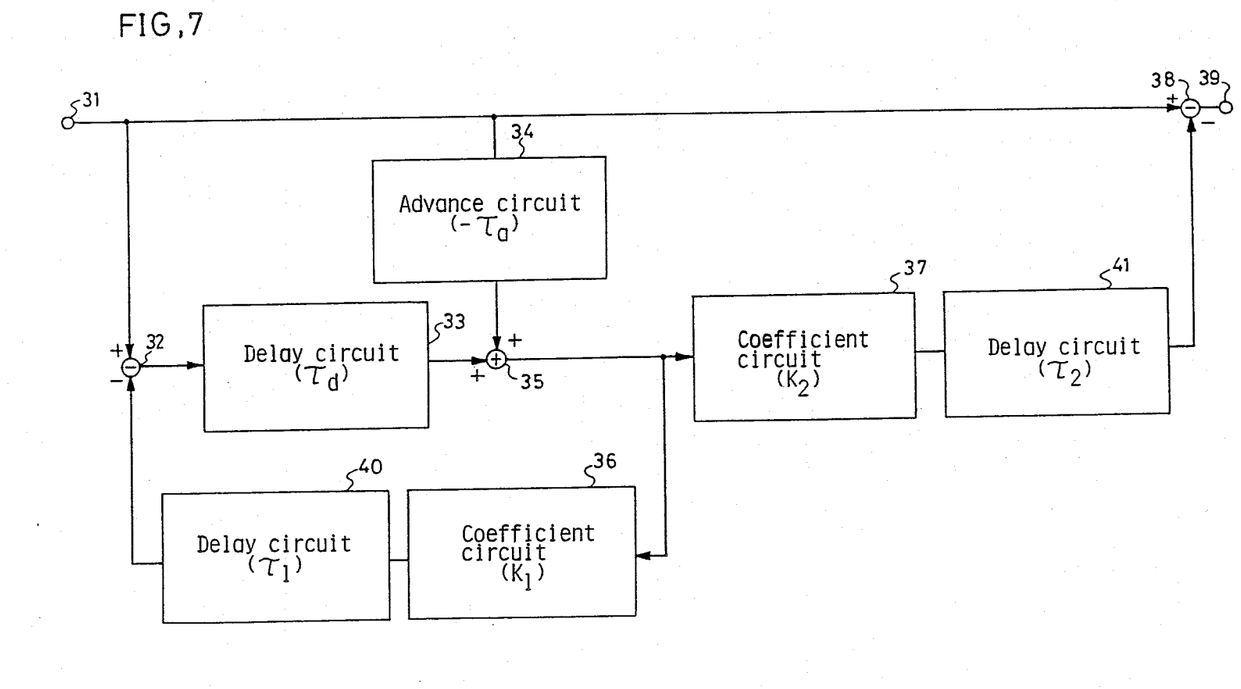
FIG. 7 is a block diagram for clearing the delay time of a coefficient circuit of FIG. 5.

FIG. 6 is an electric circuit diagram showing an embodiment of the coefficient circuits 36 and 37. FIG. 7 is a diagram in which the delay times produced by the coefficient circuits 36 and 37 are represented as independent blocks of delay circuits 40 and 41.

The operation of the above-mentioned magnetic video recording and reproducing apparatus will now be described referring to FIG. 6 and FIG. 7.

When the delay time $\tau_d$ of the delay circuit 33 is not 1H as in the conventional example, but is shortened by the delay time $\tau_1$ of the delay circuit 40, that is $$\tau_d = 1H - \tau_1 \tag{5}$$

the aforementioned equation (1) of the subtracter 32 is satisfied. The phase advance circuit 34 advances the phase corresponding to the delay time $\tau_1$ of the delay circuit 40 by advancing the phase of the input chrominance signal, thereby to cause $$\tau_a = \tau_1 \qquad (6).$$

At the adder 35, the input chrominance signal through the phase advance circuit 34 and the delayed output signal of the delay circuit 33 have such a relation as $$\tau_d = 1H - \tau_a \qquad (7).$$

Therefore, the equations (5) and (7) are realized without contradiction. At the same time, the time $\tau_a$ is short enough in comparison with the 1H and therefore the above equation (2) is practically satisfied.

Further, when the delay time $\tau_2$ of the delay circuit 41 satisfies the equation, $$\tau_2 = \tau_1 \qquad (8),$$

the following equation holds:

$$\tau_d + \tau_2 = 1H \qquad (9).$$

Therefore, the conventional delay circuit 42 shown in FIG. 3 is unnecessary.

According to the embodiment of the present invention, the adverse influence caused by the delay time $\tau_1$ of the feedback part of the recursive type comb filter can be eliminated by the constitution that the reproduced chrominance signal through the phase advance circuit 34 and the output of the delay circuit having delay time shortened from the conventional one by $\tau_1$ are added in the adder 36. Therefore, the feedback coefficient of the coefficient circuit 36 and the amplitude limiting level of the amplitude limiter can be freely set. Accordingly, a sufficient S/N improving effect and the effect of sufficient reducing of color-mis-registration are obtainable. Further, by making the delay time $\tau_2$ of the coefficient circuit 37 equal to $\tau_1$, the delay circuit 42 which is hitherto necessary, can be omitted, thereby lowering the cost of the apparatus.

The phase advance circuit 34 is also composed of a capacitor and resistors as shown in FIG. 6. Therefore, the phase advance circuit 34 and the coefficient circuits 36 and 37 may be made by a common circuit structure as shown in FIG. 6 and thus can be put into practical use at a low cost.

Figure 8:
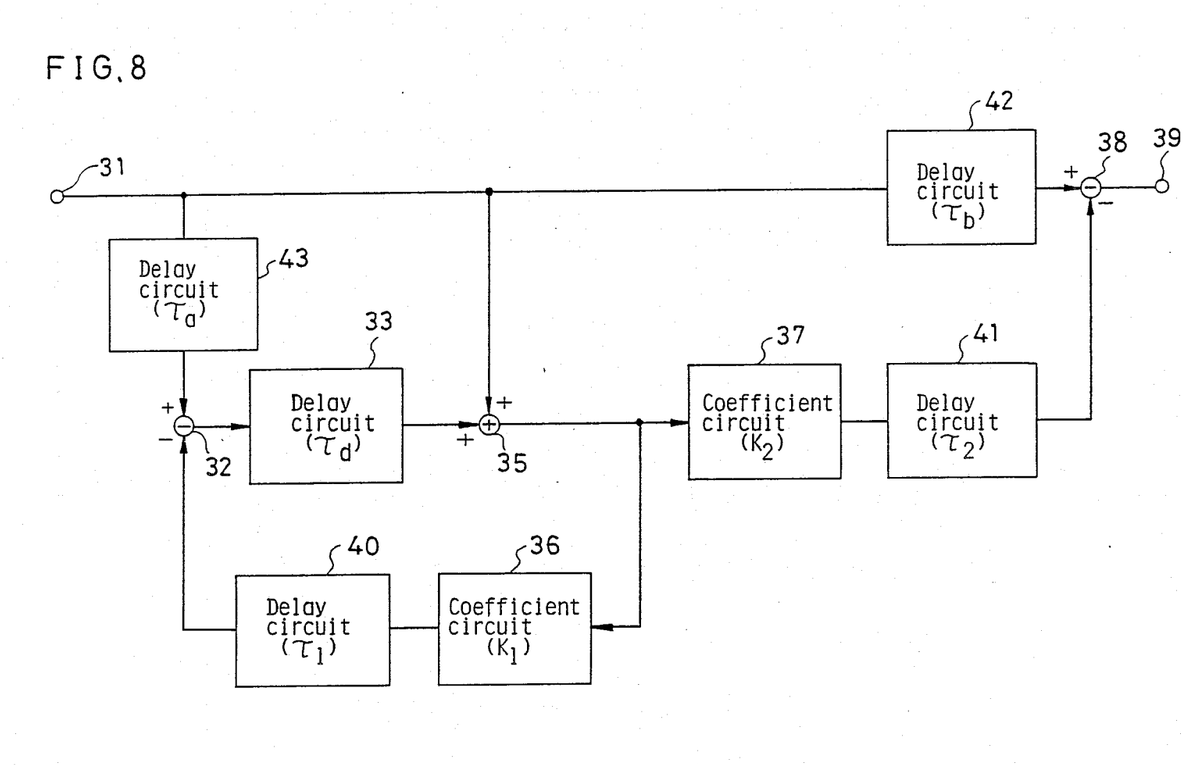
FIG. 8 is a block diagram of another embodiment of the recursive type comb filter of the present invention.

A second embodiment of the recursive type comb filter of the present invention is described referring to FIG. 8.

FIG. 8 is a block diagram of the recursive type comb filter of the second embodiment of the present invention. The parts 31 to 33 and 35 to 41 in FIG. 8 correspond to the parts 31 to 33 and 35 to 41 in FIG. 7, respectively. A delay circuit 43, connected between the input end terminal 31 and the subtracter 32, having the same delay time $\tau_a$ as the delay time $\tau_1$ of the feedback part, and a delay time circuit 42, connected between the input terminal 31 and the subtracter 38, having the same delay time $\tau_b$ as the delay time $\tau_2$ of the coefficient circuit 37, are provided instead of the phase advance circuit 34 of FIG. 7.

The operation of the magnetic video recording and reproducing apparatus having the above-mentioned recursive type comb filter, is described as follows.

The reproduced chrominance signal is applied to the subtracter 32 through the delay circuit 43 having the same delay time $\tau_a$ as the delay time $\tau_1$ of the delay circuit 40. The delay time $\tau_d$ of the delay circuit 33 is not 1H of the conventional example, but is shortened by the delay time $\tau_1$ of the delay circuit 40, so as to obtain the following equations:

$$\tau_a = \tau_1 \qquad (10),$$

$$\tau_d = 1H - \tau_1 \qquad (11).$$

Then, at the subtracter 32, the output of the delay circuit 43 and the feedback signal through the coefficient circuit 36 have the following relation:

$$\tau_d + \tau_1 = 1H \qquad (12).$$

At the adder 36, the reproduced chrominance signal and the output delay signal of the delay circuit 43 have the following relation of the equation.

$$\tau_a + \tau_d = 1H \qquad (13).$$

Therefore, the equations (10) to (13) can hold without contradiction.

At the subtracter 38, the output signal of the delay circuit 42 and the output signal of the coefficient circuit 37 have the following relation:

$$\tau_a + \tau_d + \tau_2 = 1H + \tau_b \qquad (14).$$

From the equations (13) and (14), it is understood that the delay time $\tau_b$ of the delay circuit 42 should be designed to be equal to the delay time $\tau_2$.

As mentioned above, according to the above embodiment in which the reproduced chrominance signal through the delay circuit 43 is applied to the subtracter 32 and the signal obtained by the subtraction is applied to the delay circuit 33 of the delay times shortened by $\tau_1$, the equal effect to the first embodiment can be obtained except that the delay circuit 42 is not unnecessary as in the first embodiment. Further, since the phase advance circuit is not used but the delay circuit 43 is used, constitutions suitable for IC circuits are obtainable.

A third embodiment of the recursive type comb filter of the present invention is described as follows referring to FIG. 9.

Figure 9:
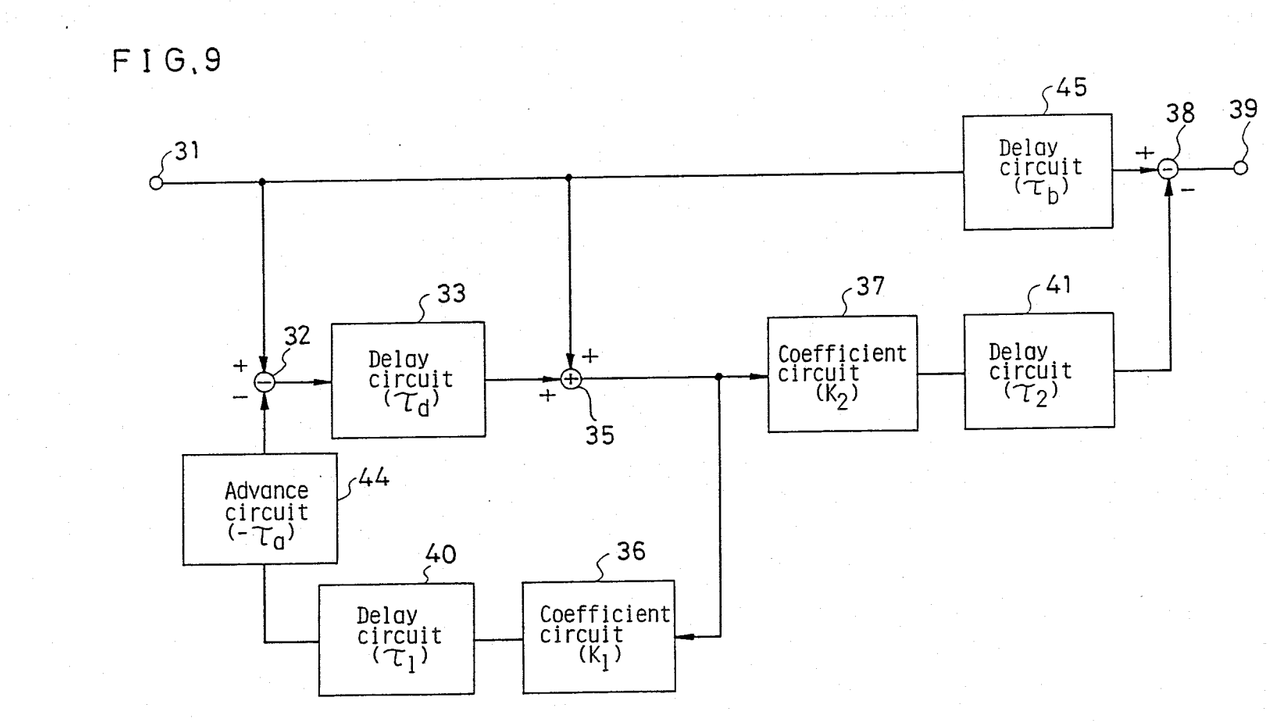
FIG. 9 is a block diagram of yet another embodiment of the recursive type comb filter of the present invention.

FIG. 9 is a block diagram showing the third embodiment of the recursive type comb filter of the present invention. The parts 31 to 33 and 35 to 41 in FIG. 9 correspond to the parts 31 to 33 and 35 to 41 in FIG. 3, respectively. The phase advance circuit 44 is inserted between the coefficient circuit 36 and the second subtracter 32, which is different from the example in FIG. 5.

The operation of the recursive type comb filter of FIG. 9 is described as follows.

Under such a condition that the phase advance circuit 44, which advances the phase by an amount corresponding to the delay time $\tau_1$ of the delay circuit 40, is inserted between coefficient circuit 36 and the subtracter 32, the relation of the input chrominance signal and the feedback signal through the coefficient circuit 36 at the subtracter 32 is represented by the following equation:

$$\tau_d + \tau_1 - \tau_a = 1H \tag{15}$$

Further at the adder 35, the relation of the input chrominance signal and 1H delay output signal is represented by the following equation:

$$\tau_d = 1H \tag{16}$$

Therefore, the equations (15) and (16) holds without contradiction. The relation of the output signal of the delay circuit 42 and the output signal of the coefficient 37 at the subtracter 38 are represented by the above-mentioned equations (3) and (4).

As mentioned above, according to the above-mentioned embodiment, in which the phase advance circuit 34 which advances the phase by the time period equal to the delay time $\tau_1$ of the delay circuit 40, the equal effect to that of the first embodiment can be obtained, though the delay circuit 42 is necessary unlike the first embodiment. Further, since the delay time of the delay circuit 33 is 1H, the constitution suitable for the case using the delay circuit 33 at recording time is obtainable.

As mentioned above, the present invention can offer such recording and reproducing apparatus which is low in price and has little picture deterioration such as cross color disturbance, without provision of a further comb filter by using, at recording, the comb filter which is conventionally used only at reproducing.

Further, the present invention offers such recording and reproducing apparatus that sufficient S/N improvement effect and the effect of reducing color-mis-registration can be obtained by dealing with the feedback part delay time which has been an obstacle to the capability of the conventional recursive type comb filter by making the time relation of the signals of the subtracter and the adder satisfy the preferable design condition of the recursive type comb filter by using the above-mentioned phase advance circuit or the above-mentioned delay circuit.

Although the invention has been described in its preferred form with a certain degree of particularity, it is understood that the present disclosure of the preferred form may be changed in the details of construction and that the combination and arrangement of parts may be resorted to without departing from the spirit and the scope of the invention as hereinafter claimed.

What is claimed is:

1. A recording and reproducing apparatus for a color television signal, comprising:
    a first low pass filter for separating a luminance signal from a color television signal to be recorded,
    a comb filter for separating a chrominance signal from said color television signal,
    switching means for inputting said color television signal for recording to said comb filter during recording and for inputting a reproduced converted chrominance signal to said comb filter during reproducing,
    an FM modulator for frequency-modulating said luminance signal to obtain an FM luminance signal of a low carrier wave,
    a first converter for converting the frequency of the chrominance signal separated from said color television signal for recording into a low frequency band after filtering by said comb filter during recording, thereby to obtain a low-band-converted chrominance signal such that recorded chrominance signals on neighboring recording tracks have an interleave relation with respect to each other,
    a first mixer for mixing said FM luminance signal of a low carrier wave with said low-band-converted chrominance signal,
    magnetic heads for recording an output signal of said mixer on a magnetic recording medium, the magnetic heads of neighboring tracks having different azimuth angles with respect to each other,
    a high pass filter for separating an FM luminance signal of a low carrier wave from a reproduced signal,
    a second low pass filter for separating a low-band-converted chrominance signal from said reproduced signal,
    a frequency demodulator for demodulating said reproduced FM luminance signal of said low carrier wave to obtain a reproduced luminance signal,
    a second converter for converting the frequency of said reproduced low-band-converterted chrominance signal into a reproduced converted chrominance signal, and
    a second mixer for mixing during reproducing said demodulated luminance signal with said reproduced converted chrominance signal which has passed through said comb filter via said switching means during reproducing, thereby to obtain a reproduced color television signal.

2. A recording and reproducing apparatus for a color television signal in accordance with claim 1, wherein said comb filter comprises:
    an input end terminal connected to a first subtracter, an adder and a second subtracter,
    a first delay circuit connected between an output terminal of said second subtracter and an input terminal of said adder,
    a first coefficient circuit connected between an output terminal of said adder and an input terminal of said second subtracter,
    a second coefficient circuit connected between said output terminal of said adder and an input terminal of said first subtracter,
    an output end terminal connected to an output terminal of said first subtracter, and
    a phase advance circuit inserted between said input end terminal and said input terminal of said adder such that phase of said input chrominance signal and a phase of an output signal of said first delay circuit coincide with each other at said adder.

3. A recording and reproducing apparatus for a color television signal in accordance with claim 1, wherein said comb filter comrises:
    an input end terminal connected to a first subtracter, an adder and a second subtracter,
    a first delay circuit connected between an output terminal of said second subtracter and an input terminal of said adder,
    a first coefficient circuit connected between an output terminal of said adder and an input terminal of said second subtracter,
    a second coefficient circuit connected between said output terminal of said adder and an input terminal of said first subtracter,
    an output end terminal connected to an output terminal of said first subtracter, a second delay circuit inserted between said input end terminal and said input terminal of said second subtracter such that the phase of said input chrominance signal and the phase of the output of said first delay circuit coincide with each other at said adder, and the phase of the output signal of said first coefficient circuit and the phase of the utput signal of said second delay circuit coincide with each other at said second subtracter, and a third delay circuit inserted between said input end terminal and said first subtracter.

4. A recording and reproducing apparatus for a color television signal in accordance with claim 1, wherein said comb filter comprises:

an input end terminal connected to a first subtracter, an adder and a second subtracter, a first delay circuit connected between an output terminal of said second subtracter and an input terminal of said adder, a first coefficient circuit connected between an output terminal of said adder and an input terminal of said second subtracter, a second coefficient circuit connected between said output terminal of said adder and an input terminal of said first subtracter, an output end terminal connected to an output terminal of said first subtracter, a phase advance circuit inserted between said first coefficient circuit and said input terminal of said second subtracter such that the phase of said input chrominance signal and the phase of the output of said first coefficient circuit coincide with each other at said second subtracter, and a second delay circuit inserted between said input end terminal and said first subtracter.

* * * * *